Oct. 16, 1934.  C. A. PRESSNALL  1,976,891
EXPANSIBLE CLUTCH FOR WIND MOTORS
Original Filed Aug. 1, 1928  3 Sheets-Sheet 1

Inventor:
Charles A. Pressnall
by Lester L. Sargent
Atty.

Oct. 16, 1934.  C. A. PRESSNALL  1,976,891
EXPANSIBLE CLUTCH FOR WIND MOTORS
Original Filed Aug. 1, 1928   3 Sheets-Sheet 2
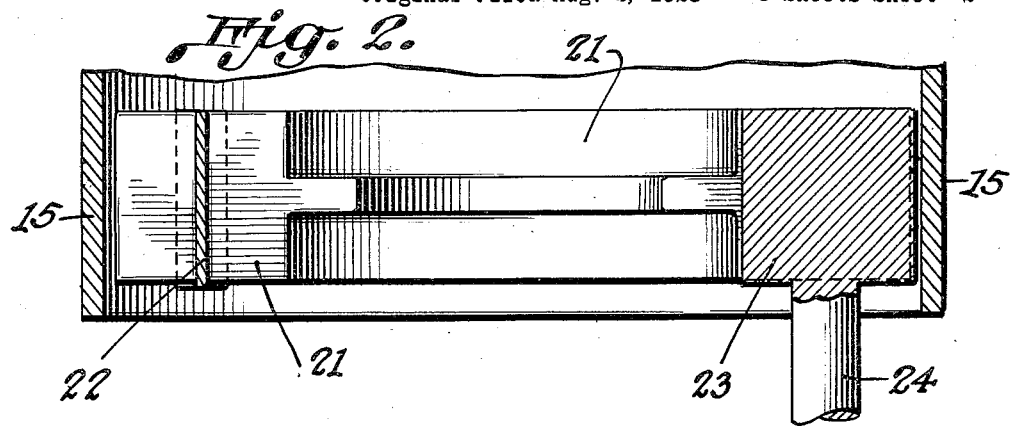
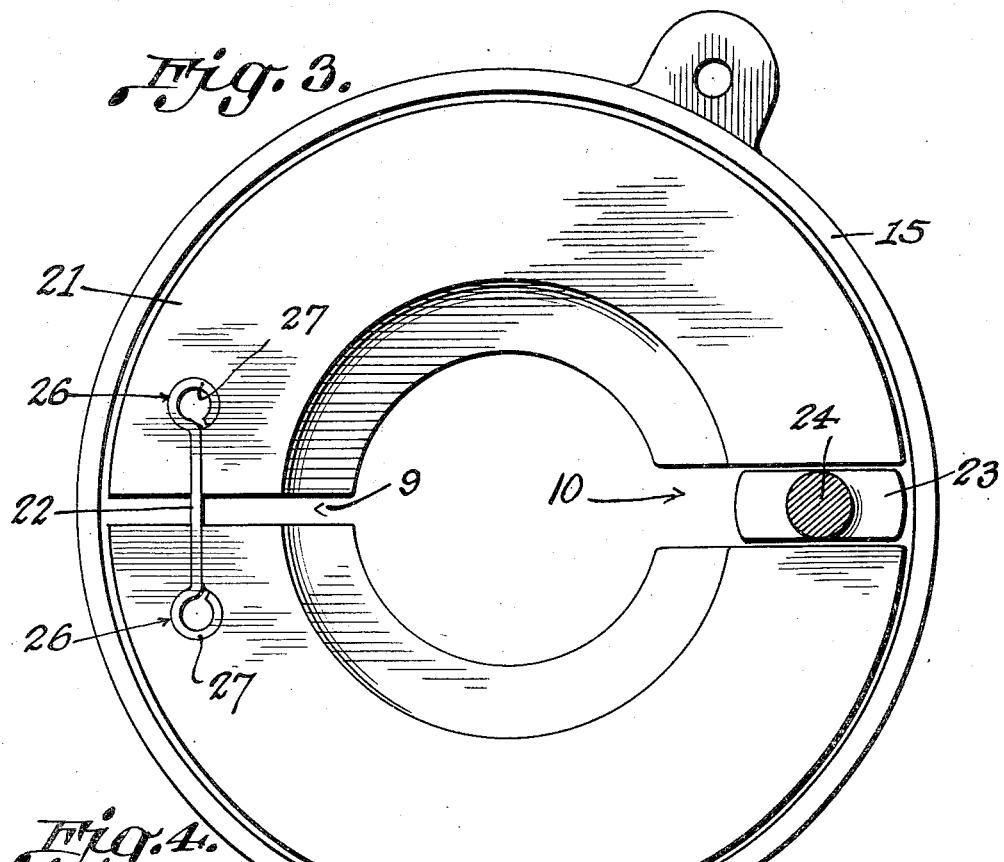
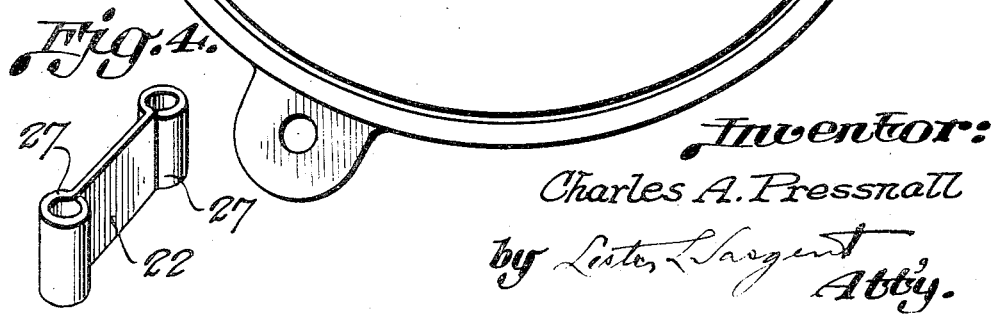
Inventor:
Charles A. Pressnall
by Lester L. Sargent
Atty.

Oct. 16, 1934.   C. A. PRESSNALL   1,976,891
EXPANSIBLE CLUTCH FOR WIND MOTORS
Original Filed Aug. 1, 1928   3 Sheets-Sheet 3

Inventor:
Charles A. Pressnall
by Lester Sargent
Atty.

Patented Oct. 16, 1934

1,976,891

UNITED STATES PATENT OFFICE 1,976,891

EXPANSIBLE CLUTCH FOR WIND MOTORS

Charles Alvah Pressnall, Elkhart, Ind.

Original application August 1, 1928, Serial No. 296,705. Divided and this application December 15, 1930, Serial No. 502,556

1 Claim. (Cl. 188—78)

The object of my invention is to provide a novel and efficient clutch for wind motors of the type described in my application, Ser. 296,705, filed August 1, 1928, now Patent 1,793,748, dated February 24, 1931, of which this application is a division.

I attain the object of my invention by the apparatus illustrated in the accompanying drawings, in which,—

Fig. 2 is a transverse section through my expansible clutch;

Fig. 3 is a top plan view of the expansible clutch in neutral position;

Fig. 4 is a detail of flat spring link 22; and

Like numerals designate like parts in each of the several views.

Referring to the accompanying drawings, there is illustrated a wind motor which I have devised and to which my invention applies, having a main vertical shaft 1 to which is keyed or otherwise rigidly secured the main frame members 2 and 2a which are horizontally disposed and in alinement with each other; one at the bottom and the other at the top of the vanes 6 and 7. The frame members are provided with centrally located hubs 3 and 3a.

Figure 1:
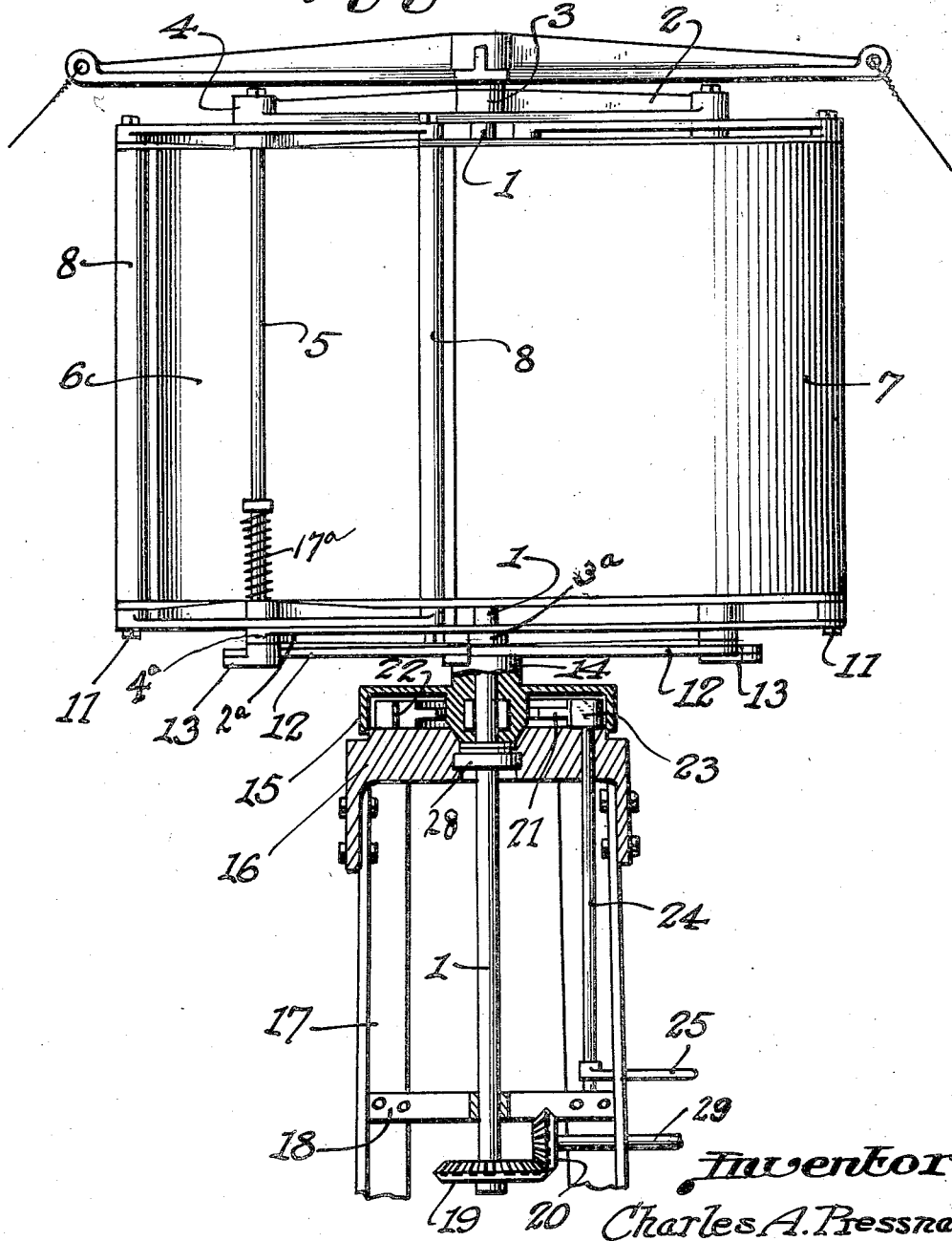
Figure 1 is a view partly in section and partly in elevation of my invention applied to a wind motor.

The frame members 2 and 2a are preferably ribbed, as shown, and taper outwardly from the center to their extremities where they are provided with hubs 4 and 4a which are drilled to receive the rods 5. These rods have a bearing fit in said hubs so that they are free to turn therein. I also provide the vertically disposed rods 8 to which the ends of the vanes 6 and 7 are attached. The outer extremities of bars 2 and 2a are provided with hubs 11, as shown in Fig. 1. I provide curved arms 12 pivotally connected to the short arms 13 which are attached to the rods 5, as shown.

As shown in Fig. 1, I provide a clutch housing 15 provided with an internal hub 14 which is bored to provide a bearing fit on the main shaft 1. This hub section extends externally above the top of the housing to provide clearance between said housing and the lower rib portion of frame member 2a, which rests directly on top of said hub 14, as shown. The inside wall of this clutch housing is machined to receive the expanding clutch members 21, which are also machined to provide a suitable clearance between their outside face and the inner wall of the housing when in normal position. The central portion of clutch members 21 is bored to fit loosely the internal hub of the housing, which tends to maintain the clutch members in a central position normally in relation to the said housing. The clutch members 21 are spaced as indicated by numerals 9 and 10, as shown in Fig. 3.

Figure 5:
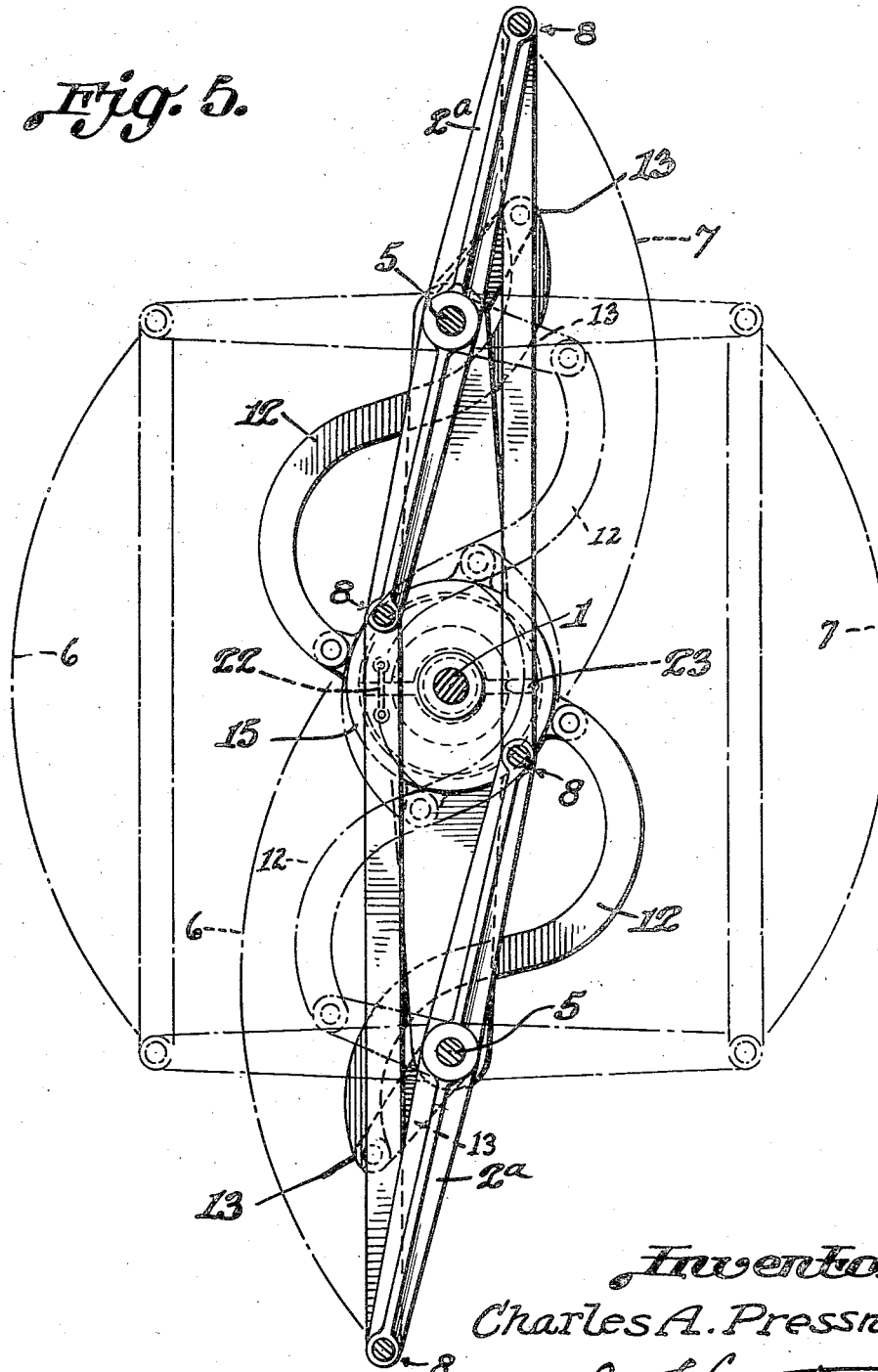
Fig. 5 is a horizontal section on line 5—5 of Fig. 1.

I provide suitable supports 17 to the top of which the tower cap 16 is fastened. I also provide suitably coiled springs 17a positioned over the rods or shafts 5 as shown in Fig. 5. The lower end of each spring extends outwardly and is operatively connected to the lower frame member while the opposite or upper end of each spring engages collars locked to the rods or shafts 5. I also provide a suitable brace member and bearing 18 for main shaft 1. The main shaft 1 at its lower end is provided with a suitable gear 19 meshing with a second gear 20 on a rod 29. I also provide a suitable operating handle 25 for the clutch rod 24, as shown in Fig. 1. The members 21 normally rest on the top of the tower cap 16 which is machined to receive the main shaft bearing 28 and the clutch rod 24.

The clutch rod 24 is provided with a cam-like head 23 which is positioned within the space 10 between clutch members 21 and has its bearing in the tower cap or equivalent as illustrated.

I provide like slots 26 in members 21 suitably shaped to receive the rolled ends 27 and a portion of the body of the flat spring link 22, as shown in Fig. 3, and which link functions to link the spaced ends of the clutch members 21 together, as illustrated.

The normal position of the clutch assembly is shown in Fig. 3. The housing 15 is free to turn on the main shaft 1 independent of the frame member 2a, or conversely the shaft 1 and the frame member 2a are free to turn independently of clutch housing 15.

When a torsional effort is applied to the clutch rod 24, the clutch members 21 are caused to expand against the inner wall of housing 15. Now, assuming the vanes are in the normal running position, namely in the position shown in full lines in Fig. 5, but not rotating, and it is desired to cause the vanes to assume the inoperative position, the control or clutch rod is actuated by means of a lever or otherwise in either direction, thus causing the clutch members 21 to expand and peripherally grip the housing. Then the main shaft is rotated slowly in the direction of rotation normally. This may be done either by hand or power in any desired or conventional manner. This results in a pull on the curved arms 12, accomplished by such rotation through the medium of the expansible clutch, which holds the clutch housing stationary while the curved arms and vane structure is thus rotated. The movement of the arms 12 and the pivotally connected short crank arms 13 is transmitted to the vertical rods or vane arm shafts 5, to the lower ends of which crank arms 13 are rigidly secured, and to the attached vane arms, thus causing the vanes to assume the neutral or out of the wind position indicated by dotted lines in Fig. 5.

When this position has been attained, the positions of the curved links or arms 12 have brought their pivot points on a dead center line with the main vertical shaft, in which position the vanes would be in the dotted line position illustrated in Fig. 5 and the torque of the tension springs applied to said arms on a dead center wither the vertical shaft, which would "lock" same in this position. Hence, irrespective of the tension or power of the springs 17a, their effort is on dead center and they cannot pull the vanes back to the running position. However, if the clutch is again actuated, and the main shaft is turned backward slightly, in a direction opposite to normal rotation, the curved arm fulcrum or point of pivoting will be forced off from dead center and the springs will then force the vanes to the normal running position, namely that shown in full lines in Fig. 5.

If the vanes are in the normal running position with insufficient wind to cause rotation, and the clutch is set "tight" the vanes will automatically move to the neutral position or toward the neutral position (shown in dotted lines in Fig. 5) during periods of high wind. If a sufficiently strong gust of wind should strike the concave vane surface squarely, both vanes would be quickly forced to the complete neutral position and held there by reason of the curved arm fulcrums or pivot points being on dead center with the main shaft.

If the machine is running and it is desired to bring it to a gradual stop, a relatively light clutch action will accomplish the result, while a more vigorous clutch action will instantly cause the vanes to assume the inoperative or neutral position and stop rotation. This clutch structure, therefore, functions both as a pull out device and brake, in one.

The device claimed is both a brake and a clutch according to how it is operated. For instance, if the clutch shoes are lightly forced against the inside walls of the clutch housing a definite frictional effort is obtained between these two members, not sufficient, however, to actually lock the two together but merely acting as a brake, thereby gradually bringing the rotating housing to a stop.

However, if the clutch shoes are forcibly pressed against the inner wall of said clutch housing they grip same as a clutch with sufficient tenacity to hold the clutch housing from rotating, and because the clutch housing is not keyed or otherwise rigidly attached to the main shaft of the wind motor, said shaft together with the main frame members, vanes, and associated parts are free to continue their rotating; hence by virtue of the mechanical connection between the clutch housing and the vertical rods 5, through the crank arms 13 and curved arms 12, the vanes and associated parts are forced from the running position to the position in which the fulcrum centers or pivot points of the crank arms 13 and curved arms 12 are on dead center, and because of this fact the applied spring tension is exerted on the said members on a dead center which effectually locks the vane structure in its inoperative position.

It will be readily understood that if the machine is operating in a low velocity wind wherein its revolutions per minute and consequent momentum could be comparatively low and if the operator desired to stop same, he could apply the clutch gently and stop rotation within two or three revolutions, or he could apply the clutch vigorously and stop rotation instantly, or practically so, but in neither case would the vanes assume the inoperative position as indicated in dotted lines in Fig. 5. However, if the machine is being driven by winds of high velocity and the speed or revolutions per minute is sufficiently great, a vigorous clutch action will cause the clutch housing to remain practically stationary for the moment, while the vane structure is pulled to the inoperative position indicated by dotted lines in Fig. 5, by virtue of the momentum of said structure and associated parts overpowering the counter action of spring tension. Thus in a period of extremely high wind or dangerous storms it is possible to cause the device to assume the inoperative position as indicated by simply exerting vigorous clutch action as explained.

If the device were nothing but a brake there could be no actual locking of the clutch members and the housing and it is not my purpose to limit the action of the device to that of a brake only. It is imperative that the device must act as a clutch in the circumstances above described.

It will be apparent that the clutch members 21 cannot rotate as the cam member 23 acts as a stop, and that when this cam member 23 is in neutral position, as shown in Fig. 3, the central hub of housing 15 maintains the clutch member in a central position relative to the internal wall of the clutch housing, thus eliminating all friction in the normal running position.

While the cam 23 is shown with substantially a rectangular cross section, it is to be understood that any desired form of cam may be employed; also that any suitable brake lining or other material may be affixed to the periphery of the clutch member 15 to take the wear or to increase the braking effect.

It is also to be understood that the main shaft and clutch rod may be extended to any desired location and that other minor details of construction may be varied without departing from the spirit of my invention.

It will be understood that power is to be taken from the main vertical shaft by means of suitable gears, pulleys, or other suitable means.

With reference to the device 15, 21, etc. if the force applied was relatively gentle, the result would be a braking action which would permit frictional slippage between the inner wall of the housing and the clutch members. If so operated it functions to retard a moving element, but if sufficient force is applied, the resultant action is not a braking effect but a clutch action wherein the frictional elements are forced rigidly against the inner housing wall in such manner as to grip and hold said housing stationary while the vanes and accessory parts of the wind motor continue to rotate approximately 90 degrees, thus effecting the out of the wind position shown by dotted lines in Fig. 5. My device as applied and used on my self governing wind motor functions as a brake or as a clutch, according to the degree of force applied to operate same.

What I claim is:

In apparatus of the type described, the combination of a clutch housing, horizontally disposed clutch members mounted therein and normally spaced slightly from the housing, said members having a slotted portion, a clutch rod, a cam like head mounted on said clutch rod and disposed between the spaced ends of the clutch members to cause same to expand and clutch the housing when the clutch rod is manually operated, said clutch members having slots, and a spring link having rolled ends shaped to seat in the aforesaid slots in the clutch members to link the spaced ends of the clutch members together.

CHARLES A. PRESSNALL.